US012131287B2

(12) United States Patent
Winckel et al.

(10) Patent No.: US 12,131,287 B2
(45) Date of Patent: Oct. 29, 2024

(54) METHOD FOR SIMULATING AND OPTIMIZING LOADING OF A TRANSPORT SYSTEM

(71) Applicant: LOHR ELECTROMECANIQUE, Hangenbieten (FR)

(72) Inventors: David Winckel, Hangenbieten (FR); Benjamin Maurin, Berstett (FR); Marc Karnoukian, Barr (FR)

(73) Assignee: LOHR ELECTROMECANIQUE, Hangenbieten (FR)

( * ) Notice: Subject to any disclaimer, the term of this patent is extended or adjusted under 35 U.S.C. 154(b) by 1124 days.

(21) Appl. No.: 16/772,316

(22) PCT Filed: Dec. 13, 2018

(86) PCT No.: PCT/FR2018/053275
§ 371 (c)(1),
(2) Date: Jun. 12, 2020

(87) PCT Pub. No.: WO2019/115962
PCT Pub. Date: Jun. 20, 2019

(65) Prior Publication Data
US 2021/0081881 A1 Mar. 18, 2021

(30) Foreign Application Priority Data
Dec. 13, 2017 (FR) ...................................... 1762037

(51) Int. Cl.
*G06Q 10/087* (2023.01)
*B60P 3/07* (2006.01)
(Continued)

(52) U.S. Cl.
CPC .............. *G06Q 10/087* (2013.01); *B60P 3/07* (2013.01); *B60P 3/08* (2013.01); *G05B 19/4155* (2013.01); *G05B 2219/50362* (2013.01)

(58) Field of Classification Search
CPC ......... G06Q 10/087; G06Q 10/08; B60P 3/07; B60P 3/08; G05B 19/4155; G05B 2219/50362
See application file for complete search history.

(56) References Cited

U.S. PATENT DOCUMENTS 4,597,712 A * 7/1986 Smith ....................... B60P 1/00
 414/733
4,690,609 A * 9/1987 Brown ................... B60P 1/5452
 414/544
(Continued)

OTHER PUBLICATIONS

International Search Report from parent PCT application PCT/FR2018/053275, 3 pages.
(Continued)

*Primary Examiner* — Michael Jared Walker
(74) *Attorney, Agent, or Firm* — Tech Valley Patent, LLC; John Pietrangelo (57) ABSTRACT

The invention concerns a method for simulating and optimizing loading of a system for transporting loads in order to determine an optimized loading plan. The method includes: a) inputting the previously defined structural and functional parameters of at least one transport system; b) inputting the number and the dimensional and weight parameters of the loads to be transported; c) inputting the spacing between the loads from previously defined values; d) inputting the route and/or the destination of the load to select the previously defined legal constraints during transport; e) carrying out an optimization calculation in real time, taking into account the parameters and constraints of steps a), b), c) and d) to
(Continued)

simulate at least one optimized loading plan consistent with all of the constraints; and f) presenting an optimized loading calculated in e) or approximating an initial loading request.

31 Claims, 3 Drawing Sheets

(51) Int. Cl.
  *B60P 3/08* (2006.01)
  *G05B 19/4155* (2006.01)

(56) References Cited

U.S. PATENT DOCUMENTS

| | | | | |
|---|---|---|---|---|
| 4,759,668 A * | 7/1988 | Larsen | ................ | B65D 88/121 |
| | | | | 410/24 |
| 4,810,160 A * | 3/1989 | Emiliani | ............... | B60P 1/5442 |
| | | | | 414/785 |
| 5,501,571 A * | 3/1996 | Van Durrett | ........... | B65G 61/00 |
| | | | | 414/21 |
| 5,525,026 A * | 6/1996 | DeMonte | .................. | B60P 1/02 |
| | | | | 414/812 |
| 6,486,787 B2 * | 11/2002 | Rieger | ................ | F15B 15/2815 |
| | | | | 340/685 |
| 7,114,905 B2 * | 10/2006 | Dibdin | ...................... | B60P 1/02 |
| | | | | 414/679 |
| 9,314,921 B2 * | 4/2016 | Jacobsen | .................... | B25J 3/04 |
| 2004/0019471 A1 * | 1/2004 | Bush | .......................... | B60P 1/00 |
| | | | | 703/6 |
| 2009/0035116 A1 * | 2/2009 | Johnson | .................. | B60P 1/483 |
| | | | | 414/631 |
| 2010/0054899 A1 * | 3/2010 | Hacker | ................. | B60P 1/6463 |
| | | | | 414/470 |
| 2013/0159208 A1 * | 6/2013 | Song | ...................... | G06Q 10/08 |
| | | | | 705/338 |
| 2015/0063973 A1 * | 3/2015 | Girtman | ................. | B65G 67/08 |
| | | | | 901/1 |
| 2015/0134184 A1 * | 5/2015 | Takeda | ................... | G06Q 50/02 |
| | | | | 701/517 |
| 2015/0360882 A1 * | 12/2015 | Girtman | ................... | B25J 11/00 |
| | | | | 414/796.5 |
| 2016/0243971 A1 * | 8/2016 | Scheer | .................... | B60P 1/483 |
| 2016/0379168 A1 * | 12/2016 | Foerster | ......... | G06Q 10/063116 |
| | | | | 705/7.16 |
| 2017/0262790 A1 * | 9/2017 | Khasis | ................... | G08G 1/012 |

OTHER PUBLICATIONS

Written Opinion from parent PCT application PCT/FR2018/053275, 10 pages.

\* cited by examiner

METHOD FOR SIMULATING AND OPTIMIZING LOADING OF A TRANSPORT SYSTEM

CROSS-REFERENCE TO RELATED APPLICATIONS

This application is a § 371 filing of PCT application PCT/FR2018/053275 filed on Dec. 13, 2018, which claims priority from French application FR 1762037 filed on Dec. 13, 2017. The disclosures of these applications are included by reference herein in their entirety.

BACKGROUND

Field of the Invention

The present invention relates to the general field of the transport of freight and in particular to the transport of vehicles. The invention concerns a method for simulating and optimizing the payload of a system for the transport of vehicles, for example by road, rail or sea, with or without containers. This method enables a user to obtain an optimized loading plan starting from a collection of vehicles to be transported and a transport system which, for example, includes a car transporter vehicle. The term "imbrication" will be used below to designate a loading plan of this type.

The invention also concerns a loading method per se.

The invention will be described below more particularly with the aid of a road car transporter vehicle also known as a road train, but is not limited to this particular transport system. Other transport systems, for example rail, sea, including or not including containers, may be used in a more efficient and more reliable manner because of the simulation and optimization method in accordance with the invention.

Prior Art

Articles are known which tackle the problems of the optimization of routes and resources applied to the field of the transport of vehicles (n starting points, n destinations, n road trains, n vehicles to be transported). In contrast to traditional freight transport, the transport of vehicles has to deal with the inherent complexity of a large disparity in the shape of the freight. This therefore makes vehicle transport systems extremely complicated. This gives rise to difficulties for operators as regards implementation and exploiting their fullest potential.

As an example, optimization methods are known in which the operator uses a compute aided design system in order to draw up their loading plan in an intuitive manner.

Furthermore, conventional constraints, in particular linked to the fuel consumption of car transporter vehicles, are not taken into account, or are not taken sufficiently into account, in these optimization problems. This is also the case for the constraints linked to premature wear, for example of car transporter vehicles, which could result in a problem of unsuccessful or incomplete optimization.

Known methods cannot be used to identify the best possible imbrication. Furthermore, the known methods give rise to paper plans which are prepared by a highly experienced, qualified designer. Thus, these methods are complicated in their implementation and time-consuming and necessitate an in-depth knowledge of the craft.

Disclosure of the Invention

The aim of the present invention is to propose a novel method for simulating and optimizing loading for a transport system that does not suffer from the disadvantages of the prior art and which provides more optimized loading solutions.

The invention also aims to propose a novel method for simulating and optimizing loading which offers maximum flexibility in loading a transport system despite taking into account an ever-increasing number of parameters generating more constraints.

The present invention also aims to propose a novel method for simulating and optimizing loading which can be used to distribute the load in a manner such as to improve the stability of the transport system and, as a result, to improve safety, in particular for road vehicles.

The present invention also aims to propose a novel method for simulating and optimizing loading which can be used to provide the best load distribution per axle and thus to reduce the risk of premature wear of certain parts.

The present invention also aims to propose a novel method for simulating and optimizing loading, which means that a vehicle hauler can increase the number of vehicles transported by its transport system and thus reduce its transport costs and its environmental impact.

The present invention also aims to propose a novel method for simulating and optimizing loading in order to load the vehicles as a function of the order of unloading, and hence to reduce the number of operations.

Another aim of the present invention is to provide a novel computer program product for carrying out the method for simulating and optimizing loading.

The invention also aims to propose a novel loading method based on the results obtained from the simulation and optimization method.

The ascribed aims of the invention are achieved with the aid of a method for simulating and optimizing a loading of a system for transporting loads in order to determine an optimized loading plan on/in a load support structure, characterized in that it comprises the following steps:

a) inputting, with the aid of a digital tool (3), the previously defined structural and functional parameters of at least one transport system;

b) inputting the number and the dimensional and weight parameters of the loads to be transported, said parameters being previously defined;

c) inputting the spacing between the loads from previously defined values;

d) inputting the route and/or the destination of the loading in order to select the previously defined legal constraints with which the loading will have to comply during transport;

e) carrying out an optimization calculation in real time, taking into account the parameters and constraints of steps a), b), c) and d) in order to define loading parameters and to simulate at least one optimized loading plan which is consistent with all of the constraints;

f) presenting, in digital form on a screen (4) of the digital tool (3) or in paper format, an optimized loading calculated in e) or approximating an initial loading request in order to determine confirmed loading parameters, and carrying out loading/unloading operations by controlling actuators of a loading/unloading system in order to position and/or move the loads in a manner such as to obtain the optimized loading calculated in e).

In accordance with one exemplary embodiment, in f), the method consists of displaying a graphical representation of a loading system on which all of the loads are distributed and identified.

In accordance with one exemplary embodiment, the method consists of dividing the loads into the form of groups of loads each comprising one or more loads, in order to define the loading parameters.

In accordance with one exemplary embodiment, the method consists of determining the position of the centre of gravity of the load support structure comprising the loads and using said position as a loading parameter.

In accordance with one exemplary embodiment, the method consists of determining the axle weight of the load support structure comprising the loads and using said weight as a loading parameter.

In accordance with one exemplary embodiment, the method consists of automatically determining the legal constraints linked to the territories to be traversed by receiving information wirelessly, in real time, via a communications network of the GSM or WIFI type.

In accordance with one exemplary embodiment, in f), the method consists of providing a loading procedure detailing the successive loading operations to be carried out by the operator.

In accordance with one exemplary embodiment, the method comprises using a computer server connected to the digital tool by means of a communications link.

In accordance with one exemplary embodiment, the method comprises using a WEB service in order to execute loading requests.

In accordance with one exemplary embodiment, the method is in the form of an application hosted by a computer, touch pad, smartphone or other digital tool or IT system.

In accordance with one exemplary embodiment, the method consists of controlling a loading/unloading robot, which may or may not be onboard.

In accordance with one exemplary embodiment, the method consists of determining, by way of loading parameters, the position on the load support structure of chocks and/or indents intended to obstruct and/or anchor said loads.

In accordance with one exemplary embodiment, the method consists of determining, by way of a loading parameter, the positions of chocks and modifications to the dimensions of indents as a function of other loading parameters.

In accordance with one exemplary embodiment of the method, the calculation operations are carried out using an algorithm of the meta-heuristic type.

In accordance with one exemplary embodiment of the method, the loading system is a car transporter vehicle and the loads are cars.

The ascribed aims of the invention are also achieved with the aid of a loading method based on using the results of the simulation and optimization method in accordance with the claims, characterized in that it consists of transforming the loading parameters into electrical, pneumatic or hydraulic control signals controlling the actuators of the loading system.

The ascribed aims of the invention are also achieved with the aid of a loading method based on using the results of the simulation and optimization method, characterized in that it consists of:
- transforming the loading parameters into electrical, pneumatic or hydraulic control signals controlling the actuators of the loading system in order to move and position the loads in/on the support structure,
- automatically activate safety means in order to lock the loads on/in the support structure once the loads are positioned in accordance with the optimized and confirmed loading plan.

In accordance with one exemplary embodiment, the method consists of automatically checking locking of the loads on/in the support structure at the level of each safety means by generating and by transmitting a physical signal to the digital tool (3) which is representative of the locking status (A) of the load on/in the support structure.

In accordance with one exemplary embodiment, the method consists of comparing the physical signals which are representative of the locking status (A) with previously defined reference signals (B) and of generating visual and/or audible warning information in the event of a difference between the physical signal which is representative of the locking status (A) and the previously defined reference signal (B) which is greater than a previously defined reference value.

In accordance with one exemplary embodiment of the method, the physical signals which are representative of the locking status (A) are determined with the aid of position sensors and/or force sensors.

The ascribed aims of the invention are also achieved with the aid of a computer program product which can be loaded directly into a memory unit of a computer, a digital tool or an IT system in order to control the implementation of the steps of the aforementioned method when the instructions from said computer program product are executed on the computer, the digital tool or the IT system.

The ascribed aims of the invention are also achieved with the aid of a computer program product which is loaded directly into a memory unit of a computer server and which can be read remotely on a computer, a digital tool or an IT system, in order to control the implementation of the steps of the aforementioned method when the instructions from said computer program product are executed on the computer server.

Advantageously, the method according to the invention can be used to universally compare vehicle transport systems.

Advantageously, the method according to the invention can be used to reduce the loading time and transport logistics studies as well as to facilitate training of new personnel who are capable of loading vehicles. Precise information may, for example, be given to an operator in order to facilitate loading, for example the location of the wheels with respect to markers, of the chock, indent or other marker type present on the road train, or of cylinder output values with direct reading on said cylinder if the latter is provided with a sensor.

By rapidly proposing with the method according to the invention, a documented solution to vehicle transport loading personnel, unnecessary handling is reduced and in particular the following is obtained:
- a reduction in drudgery and risks for the loader,
- accelerated loading,
- and a reduction in damage to vehicles during loading, unloading and during transport.

Advantageously, by rapidly proposing a regulatory solution to loading vehicles, this reduces risks linked to road accidents.

Another advantage of the simulation and optimization method according to the invention resides in implementing it for a loading system or for a collection or a fleet of loading systems. The invention may also be used to carry out an analysis in order to measure performance, in particular of the road train, the driver, the transported weight and frequency, in order to improve structural design premises.

Another advantage of the invention resides in its application to novel transport systems and to existing or old transport systems. By way of example, the invention may be used to load an old car transporter vehicle and to load a car transporter vehicle incorporating a robotic loader.

BRIEF DESCRIPTION OF THE FIGURES

Other characteristics and advantages of the invention will become apparent from the following description which is made with reference to the accompanying drawings by way of non-limiting example, in which.

DETAILED DESCRIPTION OF THE INVENTION

Structurally and functionally identical elements present on several distinct figures are provided with the same numerical or alphanumerical reference.

Figure 1:
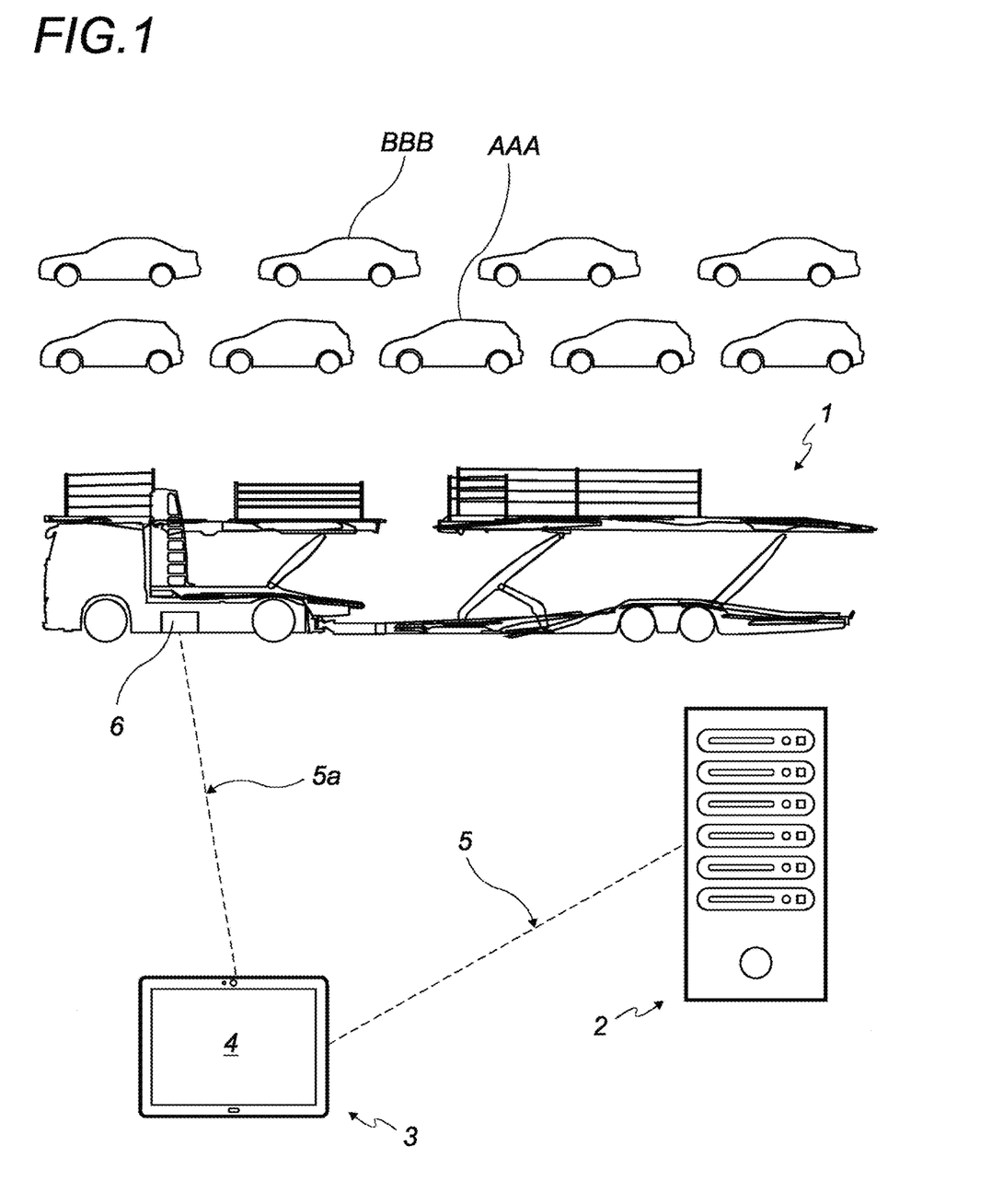
FIG. 1 is an example of a simplified diagram illustrating, with the implementation means, the simulation and optimization method according to the invention.

FIG. 1 is an example of a simplified diagram illustrating the simulation and optimization method according to the invention with implementation means. More particularly, reference will be made below to a loading system of the car transporter vehicle type 1 and to loads in the form of cars AAA and BBB. The invention is not limited to this particular type of loading system.

The method for simulating and optimizing loading according to the invention is carried out, for example, by means of a computer server 2 and a digital tool 3 of the tablet or smartphone type. The digital tool 3 advantageously comprises a touch screen 4.

In accordance with one exemplary embodiment, the invention is also based on a communications link 5, which is wireless, of the WIFI or GSM type between the computer server 2 and the digital tool 3. An additional communications link 5a between the digital tool 3 and a control unit 6 of the car transporter vehicle 1 may be cabled or wireless.

The method for simulating and optimizing loading of the car transporter vehicle 1 with cars of the type AAA and/or BBB may be used to simulate and determine an optimized loading plan. The method comprises a succession of steps in an exemplary embodiment described below.

In accordance with a step a), the method consists of inputting the previously defined structural and functional parameters for at least one car transporter vehicle 1, for example with the aid of the touch screen 4. The parameters relating to the car transporter vehicle 1 in particular include the marque and the model, the description of the loading structures, the kinematic description (i.e. the manner in which the structures move with respect to each other), the weight of the assembly, the position of the axles, the width of the car transporter vehicle 1, variations in the configuration, options (for example indents, chocks, drawbar), accessories (for example an extension piece).

In accordance with a step b), the method consists of inputting the number and the dimensional and weight parameters of the cars of type AAA and/or BBB to be transported, said parameters being at least partially previously defined. The parameters relating to cars of type AAA/BBB in particular include the marque and model of the car, the silhouette, the weight, variations in the configuration, options, engines, accessories (for example roof rack), the quantity of each model, the loading tolerance (spacing between the cars), the allotment or division into groups (i.e. the order of the loading phases and any grouping of the cars) and the legal constraints to be complied with. As an example, the legal constraints include the length of the car transporter vehicle, its height and its front end overhang.

The method according to the invention may also permit the operator to input parameters which have not yet been recorded in order to accommodate unforeseen situations or constraints. Thus, if necessary, it is possible to modify an imbrication by launching a new calculation operation in order to obtain a new imbrication. This latter then takes into account the unforeseen situations and/or constraints. It may, for example, be a modified or additional intermediate destination, a modified loading or a modified route.

Thus, in accordance with a step c), the method consists of inputting the spacing between cars of type AAA/BBB, starting from previously defined values.

Thus, in accordance with a step d), the method consists of inputting the route and/or the destination of the load in order to select the previously defined legal constraints with which the load will have to comply during transport.

Figure 2:
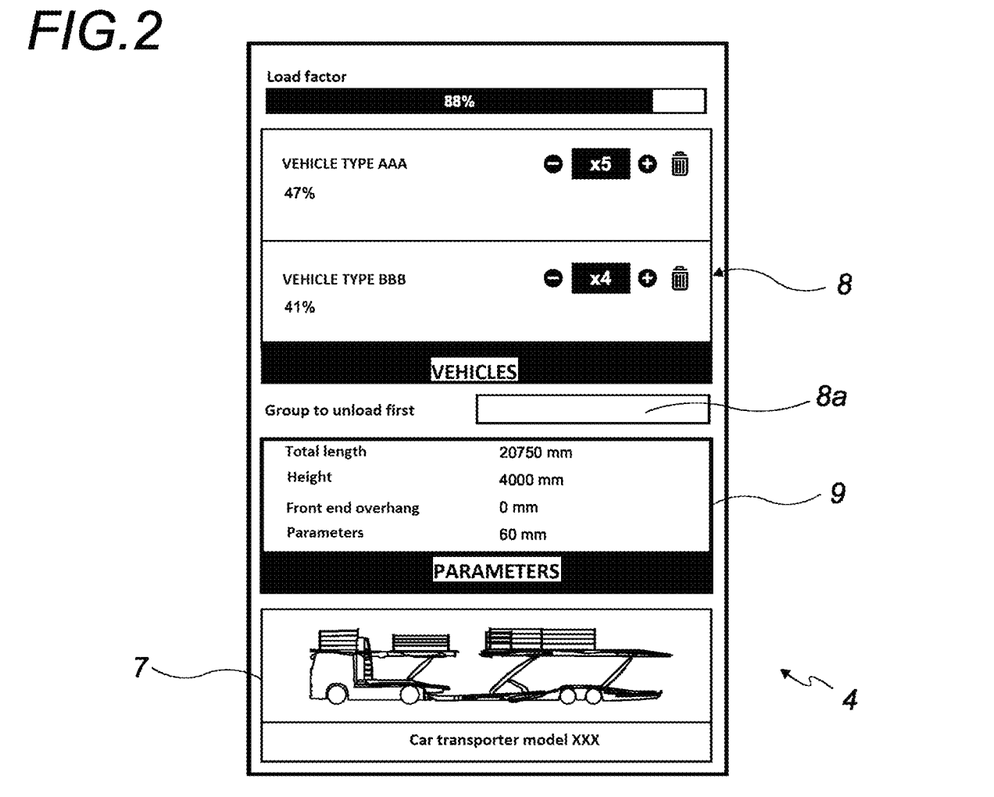
FIG. 2 illustrates a display means of a digital communication tool showing an example of parameters used in the context of carrying out the simulation and optimization method according to the invention.

By way of example, FIG. 2 illustrates the touch screen 4 of the digital communication tool 3, showing an example of parameters used in the context of the implementation of the simulation and optimization method according to the invention. Thus, the touch screen 4 displays and graphically represents the model of the car transporter 1 in a first window 7, the number of cars of each type AAA and/or BBB to be transported in a second window 8 and the legal constraints in a third window 9.

Below the window 8, information 8a pertaining to a group of cars may be provided. Thus, for this group, the locations for intermediate unloading are defined. By way of example, if given cars have to be unloaded at an intermediate destination, they must be located at the back of the road train so that they can be unloaded first.

Above the second display window 8, the method provides information regarding the overall load factor for the road train.

Figure 3:
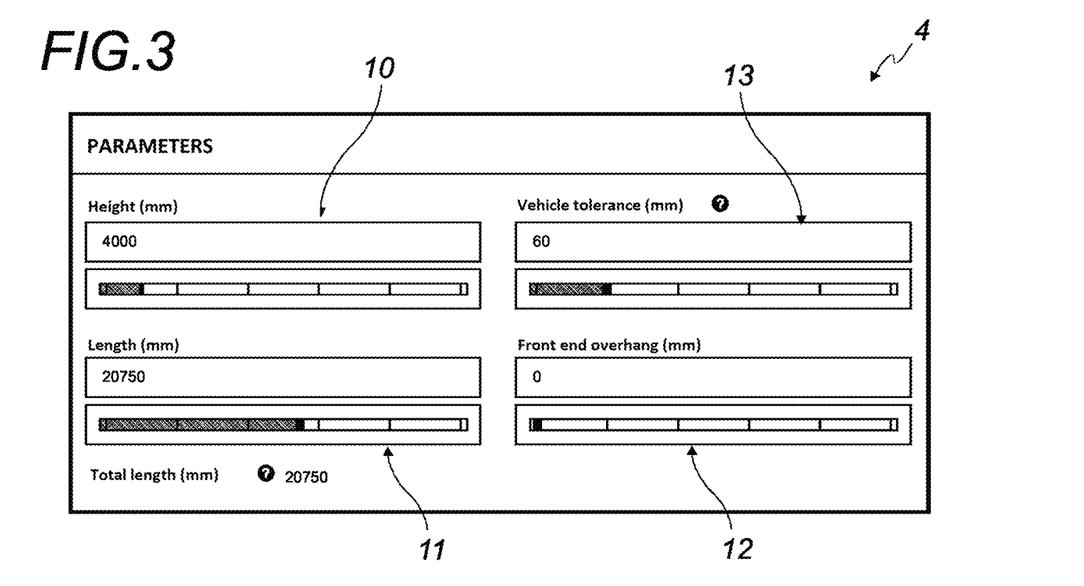
FIG. 3 illustrates the display means of the digital communication tool of FIG. 2, showing an example of other parameters used in the context of carrying out the simulation and optimization method according to the invention.

FIG. 3 illustrates the touch screen 4, showing an example of parameters linked to legal constraints used in the context of the implementation of the simulation and optimization method according to the invention. These parameters include, for example, the height of the loaded car transporter vehicle, its length, its front end overhang and the tolerance of the cars, displayed in windows 10, 11, 12 and 13 respectively. Advantageously, these parameters may be manually adjusted by means of cursors, directly by the operator on the touch screen 4.

In accordance with another exemplary embodiment, the method according to the invention consists of automatically determining the legal constraints linked to the territories to be traversed. Thus, because the heights and lengths of car transporter vehicles can change as a function of the countries which are traversed, it may be advantageous to configure the loading with dimensions which are permitted in all of the countries being passed through.

In accordance with a step e), the method then consists of carrying out an optimization calculation in real time, taking into account the parameters and constraints of steps a), b), c) and d) in order to simulate at least one optimized loading plan which is consistent with all of the constraints.

In accordance with a step f), the method then consists of presenting, in digital form or in paper format, an optimized loading calculated in e). Alternatively, the method may also display a loading which approximates to an initial loading request. It may, for example, be a loading with a quantity of vehicles of a certain model reduced by one unit in order to comply with various legal constraints and in particular structural constraints such as the bulk, the maximum load per axle, the maximum weight of the loaded car transporter vehicle 1, or otherwise. The optimized loading parameters may then be confirmed and recorded in databases which, for example, may be used for automatic learning.

In accordance with one exemplary embodiment, the method according to the invention consists, in f), of displaying a graphical representation of the car transporter vehicle 1 on which the assembly of cars has been distributed and identified.

In accordance with one exemplary embodiment, the method according to the invention consists of automatically determining the number of cars of type AAA and/or BBB of the load by replacing an initial request.

Figure 4:
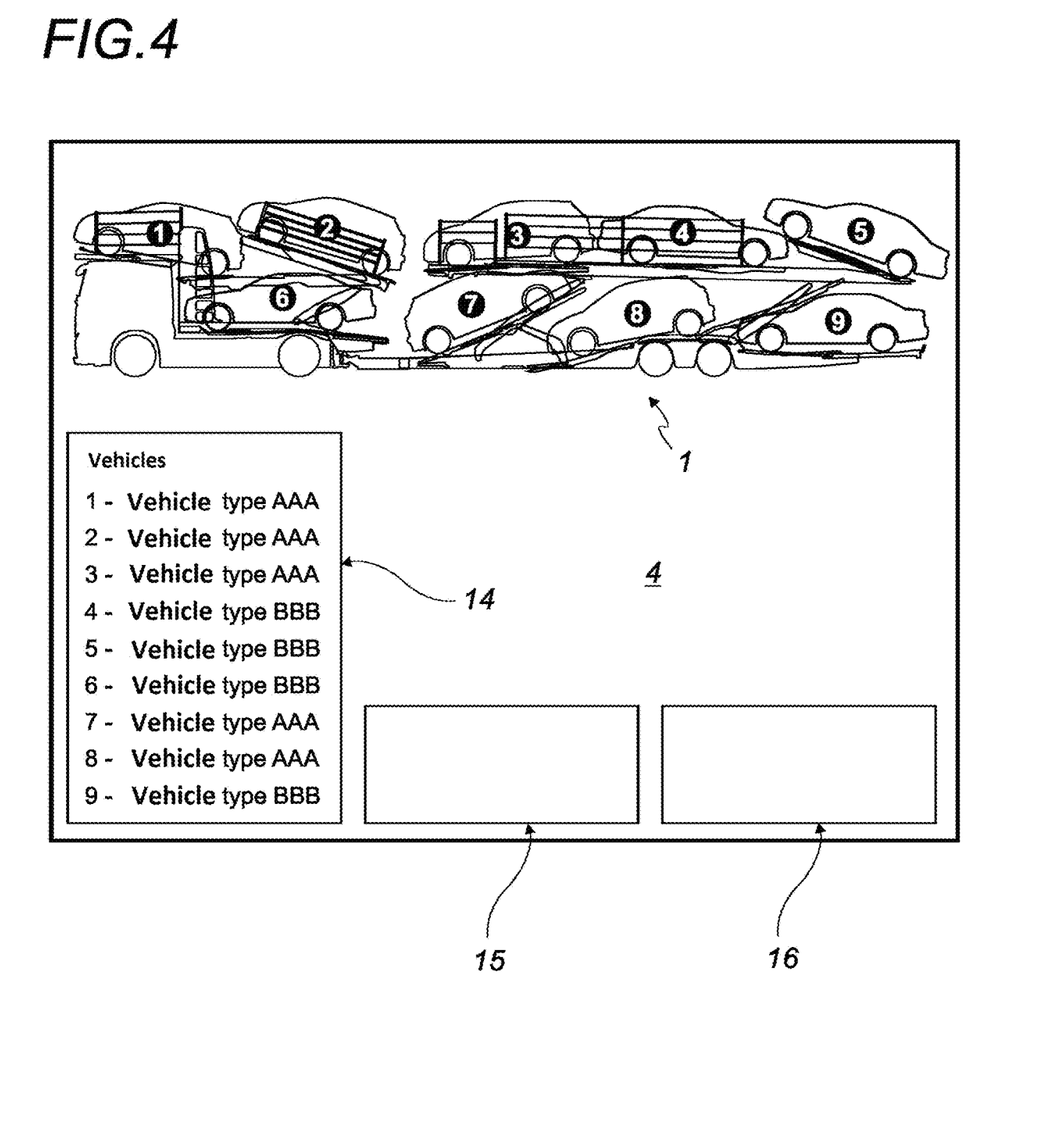
FIG. 4 illustrates a display means of the digital communication tool, showing a simulation of an example of optimized loading provided in the context of carrying out the simulation and optimization method according to the invention.

In accordance with one exemplary embodiment, the method according to the invention provides, in f), a loading procedure detailing the successive loading operations to be carried out. By way of example, FIG. 4 illustrates an example of simulated and optimized imbrication displayed on the touch screen 4 following the calculation operation in step e). The graphical representation of the simulated loading is also accompanied by a window 14 which shows the identification, the order of loading and the loading position of each model of car.

Two additional windows 15 and 16 enable, for example, information relating to the order of loading/unloading, the composition of the groups, a reminder of the legal constraints and/or tolerances between vehicles, indications of the position of actuators or cylinders, indent locations, etc, to be displayed.

Advantageously, carrying out the method according to the invention includes using a web service in order to execute loading requests.

The simulation and optimization method according to the invention is advantageously in the form of an application hosted by a computer, touch pad, smartphone or other digital tool or IT system.

In accordance with one exemplary embodiment, the method according to the invention may be used to control actuators of the car transporter vehicle 1 in order to position the cars in their optimized loading location. As an example, they may be hydraulic cylinders displacing loading platforms.

In accordance with one exemplary embodiment, the method according to the invention consists of controlling a loading and unloading robot of the car transporter vehicle 1.

In accordance with one exemplary embodiment of method according to the invention, the calculation operations are carried out using an algorithm of the meta-heuristic type.

In accordance with one exemplary embodiment, the method consists of determining, by way of loading parameters, the position on the load support structure of chocks and/or indents intended to obstruct and/or anchor said loads. The loading parameter in the method consists of determining the positions of chocks and the modifications to the dimensions of the indents as a function of other loading parameters. As an example, the indents are used to partially receive and partly immobilize the wheels of a car.

The loading method, for example for loading cars of type AAA/BBB onto car transporters 1, based on using the results of the simulation and optimization method, consists of transforming the loading parameters into electrical, pneumatic or hydraulic control signals which control the actuators of the loading system.

Advantageously, the loading method consists of:
transforming the loading parameters into electrical, pneumatic or hydraulic control signals controlling the actuators of the loading system in order to move and position the loads in/on the support structure, and
automatically activating safety means in order to lock the loads on/in the support structure once the loads are positioned in accordance with the optimized and confirmed loading plan.

In accordance with one exemplary embodiment, the loading method consists of automatically checking locking of the loads on/in the support structure at the level of each safety means by generating, and by transmitting to the digital tool 3, a physical signal which is representative of the locking status A of the load on/in the support structure.

The method consists, for example, of comparing the physical signals which are representative of the locking status A with previously defined reference signals B and of generating visual and/or audible warning information in the event of a difference between the physical signal which is representative of the locking status A and the previously defined reference signal B which is greater than a previously defined reference value.

The physical signals which are representative of the locking status A are advantageously determined with the aid of position sensors and/or force sensors and/or optical sensors.

The method for simulating and optimizing loading according to the invention is carried out by means of a computer program which is capable of being loaded directly into a memory unit of a computer, a digital tool or an IT system in order to control the implementation of the aforementioned steps when the instructions from said computer program product are executed on the computer, the digital tool or the IT system.

The method for simulating and optimizing loading according to the invention is also carried out by means of a computer program which is loaded directly into a memory unit of a computer server and which can be read remotely on a computer, a digital tool or an IT system in order to control the implementation of the aforementioned steps when the instructions from said computer program product are executed on the computer server.

The method described above, which is also known as an "imbricator", is thus a software tool which can be used to simulate the loading for a vehicle transport system and propose an optimized solution for loading as a function of a wide variety of requirements and constraints. It is therefore possible to find optimized loading plans which would have been difficult to identify, in particular in an application comprising a plurality of transport systems, for example a non-uniform fleet of car transporter vehicles 1.

The users of the simulation and optimization method according to the invention may be logistics specialists, drivers of car transporter vehicles 1 or car manufacturers.

Clearly, the invention is not limited to the preferred implementation described above and illustrated in the figures; the person skilled in the art could provide numerous modifications and imagine other variations without departing from the scope of the invention as defined in the claims. Thus, an implementational step of the method according to the invention could be replaced by an equivalent implementational step without departing from the context of the present invention and the protection provided by the claims.

The invention claimed is:

1. A method for optimizing a loading of a system for transporting loads to determine an optimized loading plan on a load support structure of the system for transporting loads, the method comprising:
   a) inputting structural and functional parameters of at least one system for transporting loads into a computer;
   b) inputting a number, dimensional parameters, and weight parameters of loads to be transported into the computer;
   c) inputting spacings between the loads into the computer;
   d) inputting one or more of a route and a destination of the loads into the computer and selecting a legal constraint for the loads during transport based upon the one or more of the route and the destination;
   e) calculating, in real time, using the computer, an optimized loading plan using the parameters and constraints of steps a), b), c), and d), the optimized loading plan comprising loading parameters, including positions, for loading the loads on the load support structure; and
   f) controlling actuators to load the loads on the load support structure based upon the optimized loading plan calculated in e).

2. The method as claimed in claim 1, wherein the method further comprises displaying a graphical representation of the optimized loading plan, and wherein the graphical-representation comprises an identification of the loads and a distribution of the loads.

3. The method as claimed in claim 1, wherein the method further comprises dividing the loads into groups of loads, and wherein each group of the groups of loads comprises one or more loads.

4. The method as claimed in claim 3, wherein the method further comprises determining a position of a center of gravity of the load support structure, and wherein e) calculating the optimized loading plan includes the position.

5. The method as claimed in claim 3, wherein the method further comprises determining an axle weight of the load support structure, and wherein e) calculating the optimized loading plan includes the axle weight.

6. The method as claimed in claim 1, wherein the legal constraint is received wirelessly, in real time, via a communications network.

7. The method as claimed in claim 1, wherein f) loading the loads on the load support structure based upon the optimized loading plan is carried out by an operator.

8. The method as claimed in claim 1, wherein a) inputting the structural and functional parameters of at least one system for transporting loads comprises inputting the parameters with a digital tool having a communications link to the computer.

9. The method as claimed in claim 1, wherein the inputting of a), b), c), and d) comprises a WEB service.

10. The method as claimed in claim 9, wherein the computer comprises one of a touch pad, a smartphone, a digital tool, and an IT system.

11. The method as claimed in claim 1, wherein f) loading the loads on the load support structure based upon the optimized loading plan calculated in e) comprises controlling a robot.

12. The method as claimed in claim 1, wherein the structural and functional parameters of at least one system for transporting loads comprise positions on the load support structure of at least one of obstructions and anchors.

13. The method as claimed in claim 12, wherein the positions of at least one of obstructions and anchors comprise a function of other loading parameters.

14. The method as claimed in claim 1, wherein e) calculating an optimized loading plan using the parameters and constraints of steps a), b), c) and d), comprises executing a meta-heuristic algorithm.

15. The method as claimed in claim 1, wherein the load support structure comprises a car transporter vehicle, and wherein the loads comprise cars.

16. The method as claimed in claim 12, wherein f) controlling actuators comprises transforming the loading parameters of the optimized loading plan into one of electrical, pneumatic, and hydraulic control signals controlling the actuators.

17. The method as claimed in claim 1, wherein f) controlling actuators to load the loads on the load support structure based upon the optimized loading plan calculated in e) comprises:
   transforming the loading parameters of the optimized loading plan into one of electrical, pneumatic, and hydraulic control signals,
   controlling the actuators with the control signals to position the loads on the support structure, and
   once the loads are positioned, locking the loads on the support structure.

18. The method as claimed in claim 17, wherein the method further comprises checking locking of the loads on the support structure by generating and by transmitting a signal representative of a locking status.

19. The method as claimed in claim 18, wherein the method further comprises comparing the signal representative of the locking status with a previously defined reference signal and generating a warning information when a difference between the signal representative of the locking status and the previously defined reference signal is greater than a previously defined reference value.

20. The method as claimed in claim 18, wherein the signal representative of the locking status comprises a signal determined with the aid of at least one of a position sensor and a force sensor.

21. A computer program product stored on one or more non-transitory computer-readable storage media and configured to implement the method recited in claim 1, wherein instructions from the computer program product are loadable and executable on a memory unit of one of a computer, a digital tool, and an IT system.

22. A computer program product stored on one or more non-transitory computer-readable storage media and configured to implement the method recited in claim 1, wherein instructions from the computer program product are loadable and executable on a memory unit of a computer server, and wherein the computer program is executable remotely on one of a computer, a digital tool, and an IT system.

23. The method as claimed in claim 1, wherein the method further comprises presenting the optimized loading plan calculated in e).

24. The method as claimed in claim 23, wherein presenting the optimized loading plan calculated in e) comprises one of displaying the plan on a screen and printing the plan on paper.

25. The method as claimed in claim 1, wherein a) inputting structural and functional parameters of the at least one system for transporting loads into the computer comprises inputting previously defined structural and functional parameters in the computer.

26. The method as claimed in claim 1, wherein b) inputting the dimensional parameters, and the weight parameters of the loads to be transported into the computer comprises inputting previously defined dimensional parameters and previously defined weight parameters into the computer.

27. The method as claimed in claim 1, wherein c) inputting the spacings between the loads into the computer comprises inputting previously defined spacings between the loads into the computer.

28. The method as claimed in claim 1, wherein d) selecting the legal constraint for the loads during transport comprises selecting the previously defined legal constraint for the loads during transport.

29. The method as claimed in claim 11, wherein the robot comprises one of an onboard robot and a not onboard robot.

30. The method as claimed in claim 1, wherein selecting the legal constraint for the loads during transport based upon the one or more of the route and the destination comprises manually selecting a legal constraint for the loads during transport based upon the one or more of the route and the destination.

31. The method as claimed in claim 1, wherein the structural and functional parameters of at the least one system for transporting loads comprises at least one of a marque and a model of the at least one system, a description of loading structures of the at least one system, a kinematic description of the at least one system, a weight of the at least one system, positions of axles of the at least one system, and a width of the at least one system.

\* \* \* \* \*